(No Model.)
G. F. SIMONDS.
BALL BEARING.
No. 466,445. Patented Jan. 5, 1892.
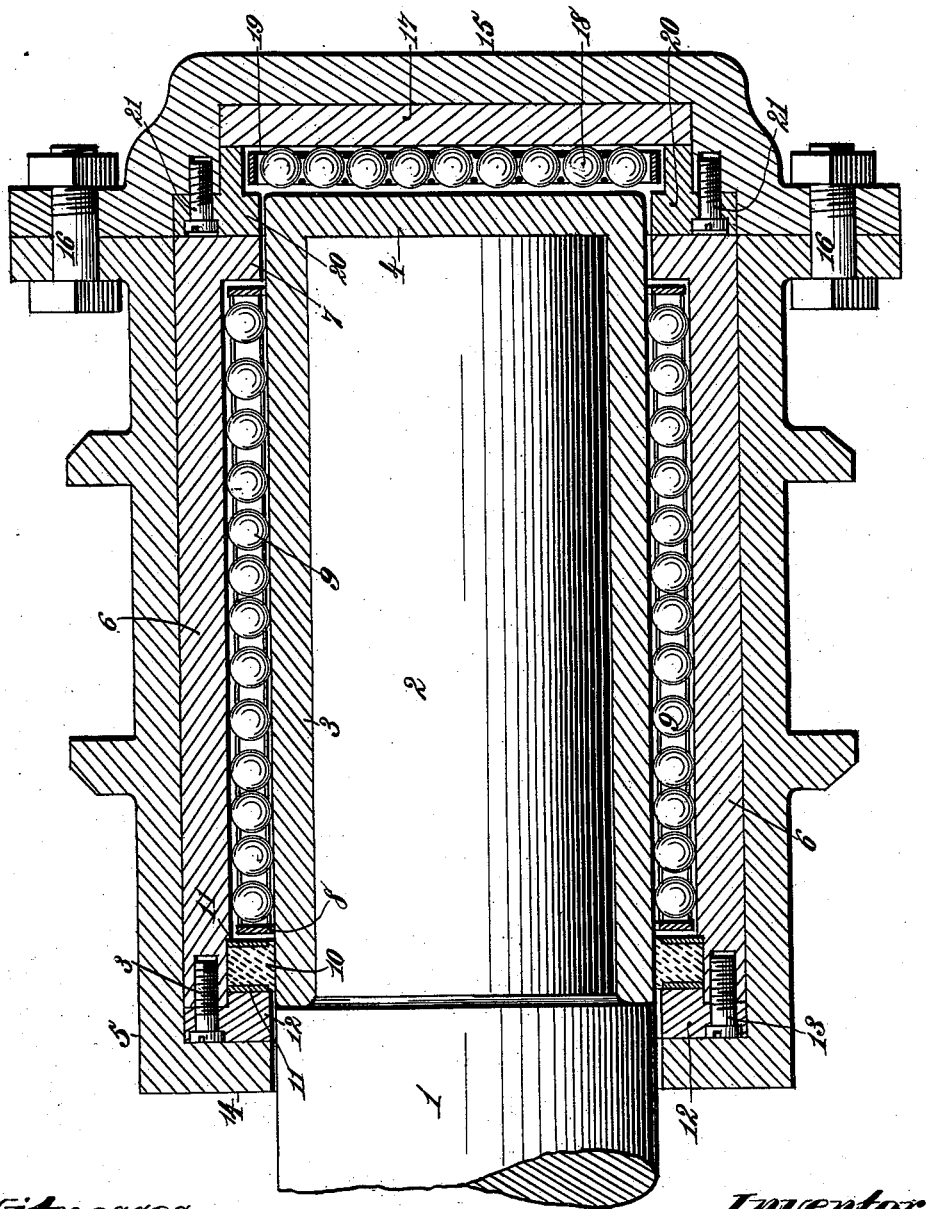
Witnesses.
Robert Emmett
J. A. Rutherford
Inventor:
George F. Simonds.
By James L. Norris
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 466,445, dated January 5, 1892.

Application filed February 24, 1891. Renewed November 6, 1891. Serial No. 411,098. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to ball-bearings of that class in which spherical rollers or balls are employed to sustain the radial pressure or weight of a shaft or axle and other balls or spherical rollers are arranged to take the end-thrust of said axle or shaft; and the invention consists in the construction and combination of parts of a ball-bearing, as hereinafter more fully set forth.

Referring to the annexed drawing, representing a longitudinal section of a ball-bearing embodying my improvement, the numeral 1 designates a portion of a shaft or axle having a reduced end or spindle 2, and on which is secured a hardened metallic sleeve or casing 3, having a closed end 4, that covers the end of said shaft or axle.

The numeral 5 designates a journal-box, in which the shaft or axle is supported. This journal-box is adapted to receive a sleeve 6, which is provided at its outer end with an internally-projecting annular shoulder 7, that surrounds the outer portion of the sleeve or casing 3 on the axle-spindle. Within the sleeve 6 is placed an annular cage 8, in which are loosely confined a number of spherical rollers or balls 9, that surround the shaft or axle in bearing contact with its hardened surface 3 and in position to sustain the radial pressure or weight of said shaft or axle and diminish friction. The annular cage 8 may be of any suitable construction, but is preferably made in the manner described in an application, Serial No. 376,289, filed by me December 30, 1890, the cage being provided with compartments formed by parallel wire rods that retain the balls 9 in operative position in such a manner that they are free to revolve in all directions and to move laterally within the cage, as well as to rotate therewith. The several balls are thus free to move in varying lines and altogether will completely cover the bearing-surfaces against which they are designed to act, thereby distributing the friction and wear uniformly. If desired, the axle or shaft may be so arranged as to have an endwise movement in the bearing, and this also will vary the contact of the balls with the bearing-surfaces and distribute wear.

After the cage of balls has been inserted in the sleeve 6 a packing-ring 10, preferably faced with washers 11, is placed in the inner end of the sleeve, which is then closed by an annular cap 12, that is secured to the sleeve by screw-bolts 13 or otherwise. It will be seen that by this construction the cage of confined balls can be inserted in and removed from the journal-box in a body with the inclosing sleeve 6 and its packing-ring and annular cap. When the sleeve 6 and the inclosed cage of balls are placed in the journal-box, the annular cap 12 abuts against the inward-projecting annular shoulder 14, formed on the inner end of said box.

The outer end of the bearing is closed by a cap or thrust-plate 15, secured by bolts 16 to the flanged outer end of the journal-box. Within the cap 15 is a hardened plate or bearing-surface 17 for contact with a number of spherical rollers or balls 18, confined in and adapted to revolve freely in all directions within a thrust-ball-bearing cage 19, that is preferably constructed in substantially the manner described in my application Serial No. 382,580, of even date herewith. The plate 17 and cage 19 are held in place by means of a shouldered ring or annular cap 20, secured by bolts 21 or other suitable means in such a manner that the cap 15 and its contents can be attached or removed in a body. It will be observed that when the cap 15 is in position the balls 18 and their cage 19 will be free to revolve between the plate 17 and the hardened end or surface 4 of the shaft or axle in such a manner as to take the thrust or end pressure thereof with a minimum of friction, and as the balls are arranged to have a free movement within the cage-compartments and together cover the whole of the bearing-surfaces the wear thereof will be evenly distributed.

In a ball-bearing of this construction removal of the cap or thrust-plate 15 permits ready access to the journal-box for the removal and replacement in a body of the balls 9, their confining-cage 8, and the inclosing sleeve 6, and as the balls 18 and cage 19 are also removable and attachable in a body with the cap 15 it is obvious that any necessary adjustment of the bearings can be effected without loss of time.

What I claim as my invention is—

1. In a ball-bearing, the combination, with a shaft or axle and its journal-box and spherical rollers or balls surrounding the shaft or axle to sustain radial pressure or weight, of a thrust-plate or cap at the end of the journal-box, spherical rollers or balls for resisting end-thrust of the axle or shaft, a cage located in the cap or thrust-plate and in which said balls are retained, and a ring or annular cap for holding said cage in the thrust-plate, substantially as described.

2. In a ball-bearing, the combination, with a shaft or axle, its journal-box, and spherical rollers or balls surrounding the shaft or axle to sustain radial pressure or weight, of a thrust-plate or cap at the end of the journal-box, a bearing-plate in said cap, a cage of thrust-bearing balls located in the cap adjacent to said plate, and a ring or annular cap for holding the cage and bearing-plate in said thrust-plate or cap, substantially as described.

In testimony whereof I have hereunto set my hand and affixed my seal in presence of two subscribing witnesses.

GEO. F. SIMONDS. [L. S.]

Witnesses:
JAMES A. RUTHERFORD,
GEO. W. REA.